Aug. 22, 1944.　　F. G. MANSON ET AL　　2,356,169
CONTROLLED PARACHUTE CANOPY
Filed Oct. 12, 1943　　2 Sheets-Sheet 1

INVENTORS
FRANK G. MANSON
JAMES J. MASKEY
BY
ATTORNEYS

Aug. 22, 1944. F. G. MANSON ET AL 2,356,169
CONTROLLED PARACHUTE CANOPY
Filed Oct. 12, 1943 2 Sheets-Sheet 2
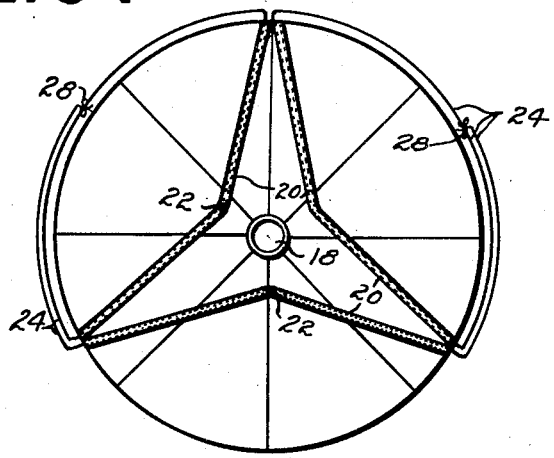
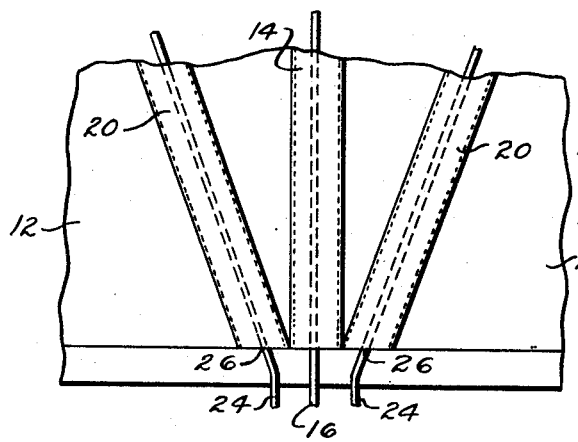
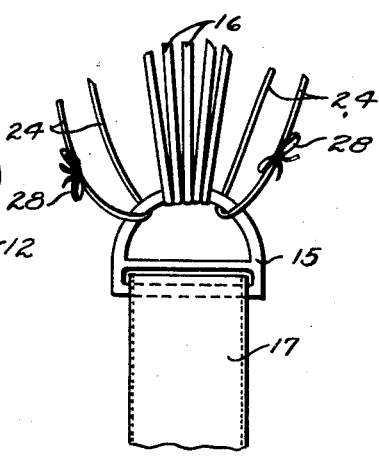
INVENTORS
FRANK G. MANSON
JAMES J. MASKEY Patented Aug. 22, 1944

2,356,169

UNITED STATES PATENT OFFICE 2,356,169

CONTROLLED PARACHUTE CANOPY

Frank G. Manson, Chicago, Ill., and James J. Maskey, Dayton, Ohio

Application October 12, 1943, Serial No. 505,910

10 Claims. (Cl. 244—152)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to parachutes, and more particularly, to means for controlling the canopy during the period of descent.

Many devices have been proposed for the achievement of this desirable end, yet thus far, the problem has not been solved without the sacrifice of some element affecting basic performance, or the addition of excess bulk.

Inasmuch as the present standardized design for a parachute canopy has eventuated after many years of experimentation, it is an object of this invention to provide a control means which will be applicable to such a standardized canopy without subjecting it to detrimental modification.

Another object is to provide a stabilizing means for the standard canopy by the simple addition of several cables similar to the shroud lines but differently arranged from those of standard practice.

Another object is to so construct and arrange the control means as to make it available for softening the shock of the opening load.

Another object is to provide a control means whereby the user may induce a certain amount of lateral movement during descent, where this becomes desirable to avoid landing among trees or in a body of water or within the enemy lines.

Inasmuch as the manner in which a parachutist leaves an aircraft often induces oscillations of a considerable degree, it is a further object to provide convenient means for more quickly neutralizing such oscillations during descent.

Other objects and advantages will become evident as the invention is further described and reference is made to the drawings, wherein, Fig. 1 is an elevational view of a parachute in descent, the parachute having the improved control means superposed on a standard canopy, the control means in this view being in its inactive state.

Fig. 5 is a top plan view of a modification of the invention.

Fig. 6 is an enlarged fragmentary view showing some of the details of construction of our improvement.

Fig. 7 is an enlarged fragmentary view showing the manner in which the ends of the control cable are paired.

Like reference characters refer to like parts throughout the several views.

Figure 1:
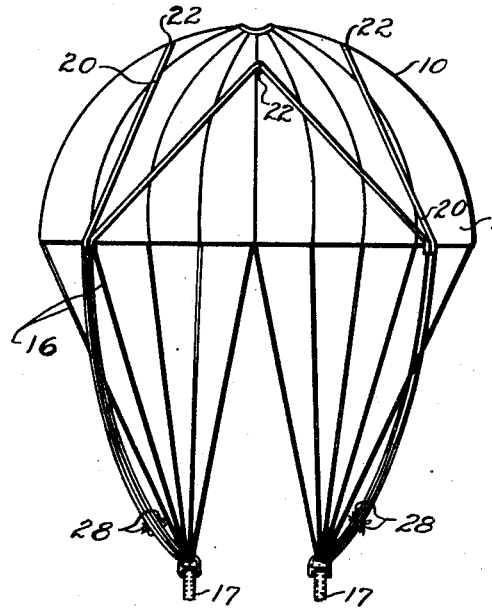

The canopy 10 is of standard shape and construction, being composed of a plurality of sectoral strips 12 joined together with radially extending lap seams as at 14 (see Fig. 6). A shroud line 16 is enclosed in each lap seam 14, being closely secured therein against movement with respect thereto, the lower ends of the shroud lines being separated into two oppositely positioned groups and connected to D rings 15 (see Fig. 7), the risers 17 from the parachute harness being attached to the D rings in the usual manner. The vent 18 at the apex of the canopy, a feature of the standard parachute, is retained.

Superposed on the canopy 10 is our improved control means, which, in the instant embodiment, comprises a series of lengths of webbing 20 (see Fig. 6), which are arranged on the canopy in a somewhat star shaped pattern (see Fig. 4) and are stitched at both edges to the canopy. Each length of webbing thus forms a conduit which begins at a point adjacent one of the lap seams 14, crosses several lap seams to an anchor point, as at 22, and returns to a point adjacent a circumferentially spaced apart lap seam.

A control cable 24 is preferably threaded into each conduit, the cable being permanently stitched fast to the canopy, but only at the anchor points 22. In order to better keep the cable in place when the device is not in use, the cables may, if desired, be lightly tacked with very light break threads at the points of the entry 26 (see Fig. 6) into the conduits.

Figure 4:
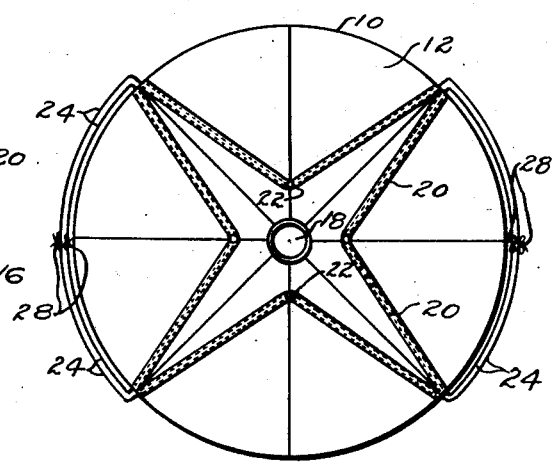
Fig. 4 is a top plan view of the canopy with the control means affixed thereto.

Fig. 4 shows an embodiment of our invention in which four strips 20 of webbing are employed and superposed on the canopy and stitched thereto in the form of a four point star. The eight ends of the four control cables 24 are brought together in pairs and tied as at 28 (see Fig. 7), two pairs in each D ring. The cable ends should be threaded through the D rings before tying, in order to have them within easy reach of the parachutist, the length of the risers 17 being preferably so governed that he may just conveniently reach the tied-together pairs of cables when his arms are extended full length upwardly. Obviously, a single control cable 24 of sufficient length may have one end fastened at any one of the points 22, and the other end threaded through all of the conduits or guides 20 and D rings 15 and back to the starting point, then securely fastened at all of the anchor points 22.

Instead of using a continuous strip 20 of webbing to provide an uninterrupted conduit for the control cables, short strips of webbing may be employed intermittently, or any other guide means, such as a series of rings or eyelets fastened to the canopy surface, outside or inside, arranged to hold the cables in the configuration shown, will be considered alternatives in the construction.

In making a descent, the jumper may pull his ripcord in the usual manner, or, if an attached parachute is being used, opening will be delayed until the static line severs the break cord. If now all of the control cables are held down at the same time, for instance, in the manner shown in Fig. 3, this will retard the opening of the parachute sufficiently to soften the shock of the opening load.

Figure 3:
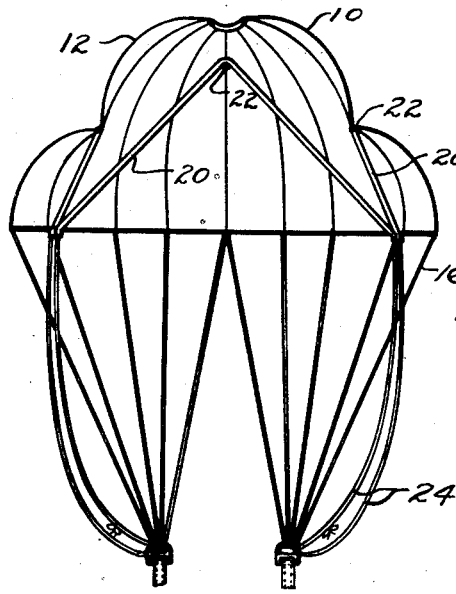
Fig. 3 is a view similar to Fig. 1 except that the control means is being used to soften the shock of the opening load.

If, after the canopy has fully opened as in Fig. 1, the jumper senses the advisability of increasing his speed, as where a paratrooper is under fire in descent, and is still at a sufficient altitude, the pulling down of all of the control cables, as shown in Fig. 3, will allow the parachute to increase the speed of descent.

Figure 2:
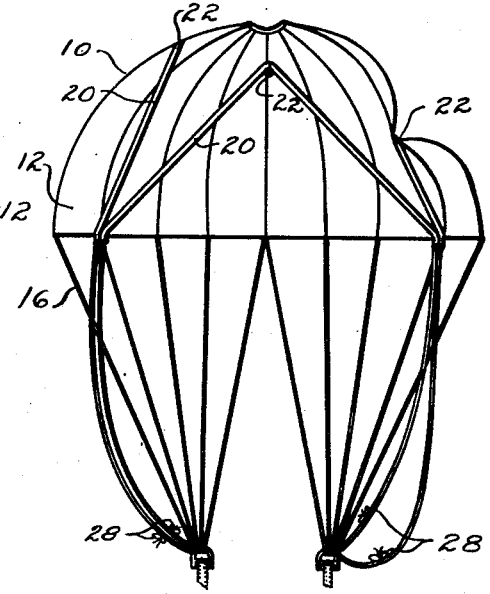
Fig. 2 is a view similar to Fig. 1 except that the control means is being used to stabilize the canopy.

On the other hand, if the desire is merely to shift the parachute laterally, or to neutralize oscillation, this may be done by pulling the cord on the side toward which it is desired to shift, as, for instance, the pulling of one cable only, as, for instance, that one shown in Fig. 2, shifts the parachute toward the right, or, if it is oscillating, the oscillations will be unbalanced and neutralized. It is noted that the cable ends are so grouped, and the groups so located with respect to the position of the user's hands that he may conveniently pull down the anchor point 22 of either cable or of any combination of them.

We claim:

1. For use with a parachute of the class having a canopy composed of a plurality of sewed-together sectoral strips and a series of shroud lines extending from the canopy apex along the seams between said strips to and beyond the rim of said canopy, the shroud lines from each semi-circumference of said canopy being gathered and secured to a D ring, and a riser secured in the lower part of each D ring, the improvement which comprises a plurality of strips of webbing stitched to the upper surface of said canopy to form tunnels, each tunnel extending from a point on the circumference diagonally across several of said seams to an anchor point intermediate the apex and the circumference, thence diagonally across several of said seams to a point on the circumference substantially ninety degrees removed from the starting point, and control cables in said tunnels secured to the canopy at the anchor points and having the free ends extending beyond the circumference, the free ends of adjacent cables being threaded through said D rings and tied together.

2. For use with a parachute of the class having a canopy composed of a plurality of sewed-together sectoral strips and a series of shroud lines extending from the canopy apex along the seams between said strips to and beyond the rim of said canopy, the shroud lines from each semi-circumference of said canopy being gathered to form a group, the improvement which comprises a plurality of strips of webbing stitched to the upper surface of said canopy to form tunnels, each tunnel extending from a point on the circumference diagonally across several of said seams to an anchor point intermediate the apex and the circumference, thence diagonally across several of said seams to a point on the circumference substantially ninety degrees removed from the starting point, and control cables in said tunnels secured to the canopy at the anchor points and having the free ends extending beyond the circumference, the free ends of cables in opposite halves of the canopy being brought together with said groups of shroud lines.

3. For use with a parachute of the class having a canopy composed of a plurality of sewed-together sectoral strips and a series of shroud lines extending from the canopy apex along the seams between said strips to and beyond the rim of said canopy, the shroud lines being gathered into groups, the improvement which comprises a plurality of strips of webbing stitched to the upper surface of said canopy to form tunnels, each tunnel extending from a point on the circumference diagonally across several of said seams to an anchor point intermediate the apex and the circumference, thence diagonally across several of said seams to a point on the circumference substantially removed from the starting point, and control cables in said tunnels secured to the canopy at the anchor points and having the free ends extending beyond the circumference, the free ends of said cables being formed into groups corresponding to the groups of shroud lines.

4. The improvement in a parachute having a canopy with a series of shroud lines extending from the canopy apex to and beyond its rim, the free ends of said shroud lines being brought together into two groups, and risers supported by said groups, said improvement comprising a plurality of control cables lying on the upper surface of said canopy, guide means for each cable so placed on said surface as to hold each cable loosely in a position extending from a point on the circumference diagonally across several of said lines to an anchor point intermediate the apex and the circumference, thence diagonally across several of said lines to a point on the circumference substantially removed from the starting point, said control cables being fastened to the canopy at the anchor points only and having the free ends extending beyond the circumference, the free ends of the cables being divided into two groups, and means to hold one group loosely adjacent each riser.

5. The improvement in a parachute wherein a canopy has a series of shroud lines extending from the canopy apex to and beyond its rim, and risers supported by said shroud lines, the free ends of said shroud lines being brought together for supporting said risers, said improvement comprising a plurality of control cables lying on the surface of said canopy, guide means for freely receiving each cable, so placed on said surface as to hold each cable loosely in a position extending from a point on the circumference diagonally across several of said lines to an anchor point intermediate the apex and the circumference, thence diagonally across several of said lines to a point on the circumference substantially removed from the starting point, said control cables being fastened to the canopy at the anchor points only and having the free ends extending beyond the circumference, the free ends of the cables being divided into groups, and means to hold one group loosely adjacent each riser.

6. The improvement in a parachute having a canopy with a series of shroud lines extending from the canopy apex to and beyond its rim, the free ends of said shroud lines being brought together into groups, said improvement comprising a plurality of control cables lying along the surface of said canopy, guide means for freely receiving each cable, so placed along said surface as to hold each cable loosely in a position extending from a point on the circumference diagonally across several of said lines to an anchor point intermediate the apex and the circumference, thence diagonally across several of said lines to a point on the circumference substantially removed from the starting point, said control cables being fastened to the canopy at the anchor points only, and having the free ends extending beyond the circumference, the free ends of the cables being divided into groups, corresponding to and positioned near the groups of shroud lines.

7. The improvement in a parachute having a canopy, said improvement comprising a plurality of control cables lying along the surface of said canopy, guide means for freely receiving each cable, so placed along said surface as to hold each cable loosely in a position extending from a point on the circumference across several of said lines to an anchor point intermediate the apex and the circumference, thence across several of said lines to a point on the circumference substantialy removed from the starting point, said control cables being fastened to the canopy at the anchor points only, and having the free ends extending beyond the circumference, the free ends of the cables being divided into groups conveniently positioned for actuation during descent.

8. In a parachute having a canopy, the improvement which comprises a plurality of control cables, anchored in circumferentially spaced apart positions to the canopy at their mid points only, said positions being intermediate the apex and the periphery, the two halves of each cable adjacent the anchor point extending downward in the form of an inverted V, guide means on said canopy for loosely holding said halves to maintain said inverted V formation on said canopy, the free ends of all of said cables extending below the periphery of said canopy and being brought together and formed into two groups conveniently positioned, one for each hand of a chutist.

9. In a parachute having a canopy, the improvement which comprises a plurality of control cables, anchored to the canopy at their mid points only, in a position intermediate the apex and the periphery, the two halves of each cable extending downward in the form of an inverted V, guide means on said canopy for loosely holding said haves to maintain said inverted V formation on said canopy, the free ends of said cables extending below the periphery of said canopy and being brought together and formed into groups conveniently positioned for the hands of a chutist.

10. In a parachute having a canopy, the improvement which comprises a control cable, anchored to the canopy at its mid point only, in a position intermediate the apex and the periphery, the two halves of said cable extending downward in the form of an inverted V, guide means on said canopy for loosely holding said halves to maintain said inverted V formation on said canopy, the free ends of said cable extending below the periphery of said canopy and positioned for operation by the hand of a chutist.

FRANK G. MANSON.
JAMES J. MASKEY.